2,989,040
OSCILLATING-PISTON INTERNAL COMBUSTION ENGINES
Wsewolod Zalisko, 177 5th St., Jersey City, N.J.
Filed Dec. 31, 1957, Ser. No. 706,384
1 Claim. (Cl. 121—18)

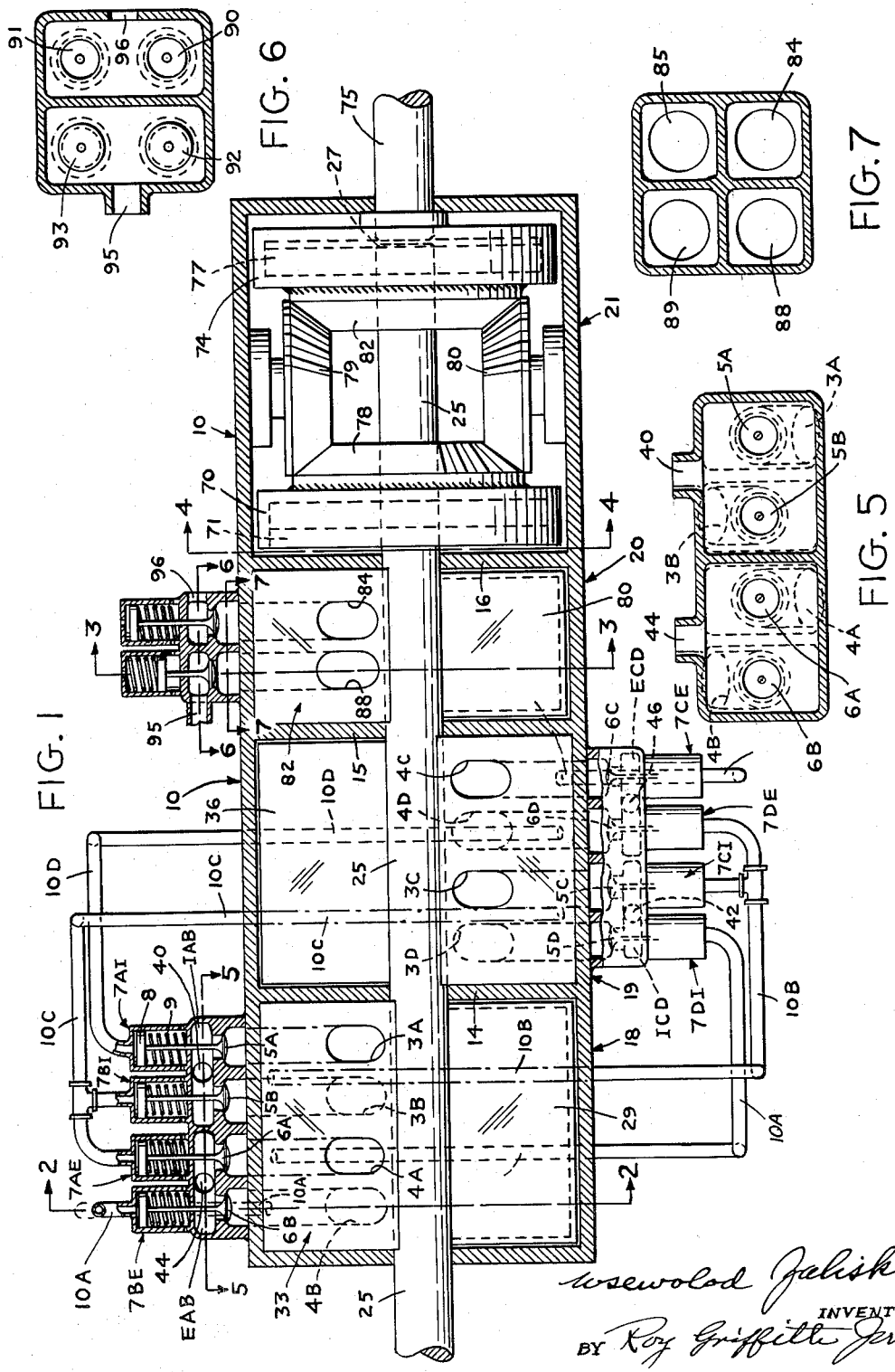

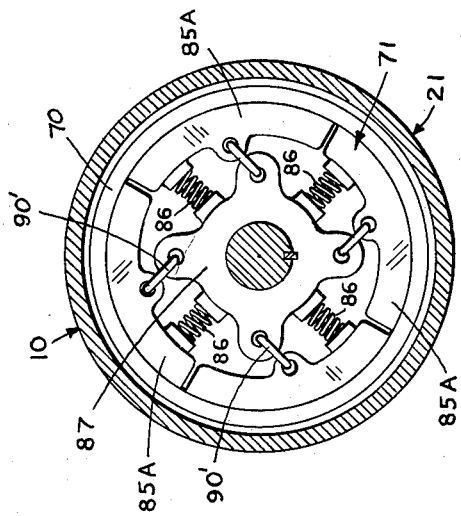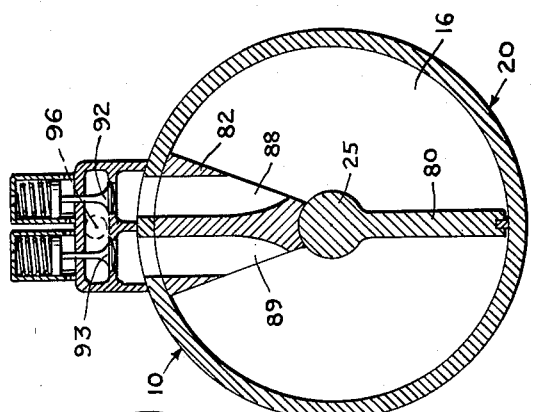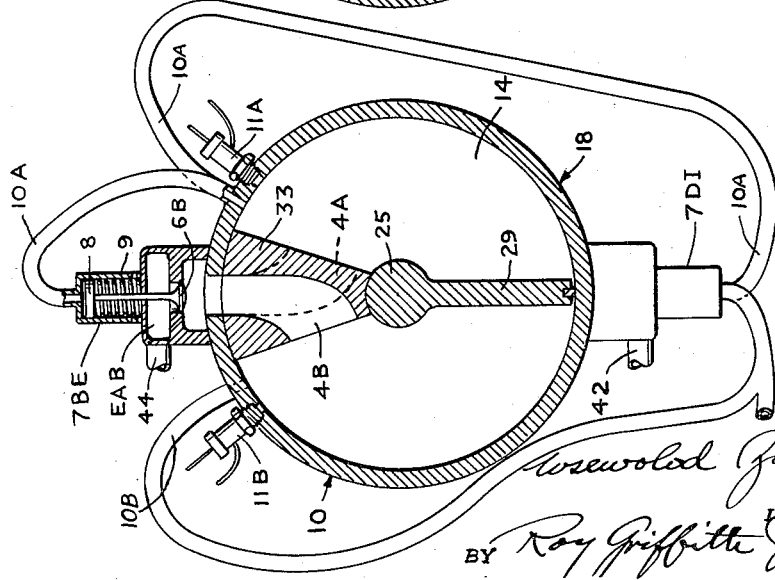

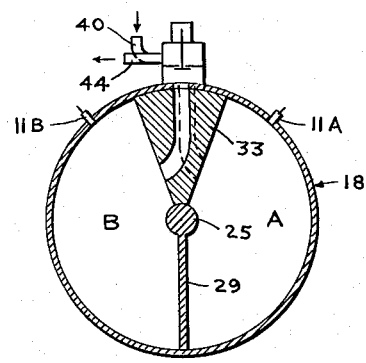
FIG. 8
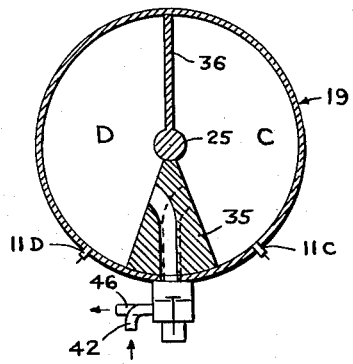
FIG. 9
| PHASE | INTAKE | COMPRESSION | COMBUSTION | EXHAUST |
|---|---|---|---|---|
| 1 | A | B | D | C |
| 2 | C | A | B | D |
| 3 | D | C | A | B |
| 4 | B | D | C | A |
FIG. 10
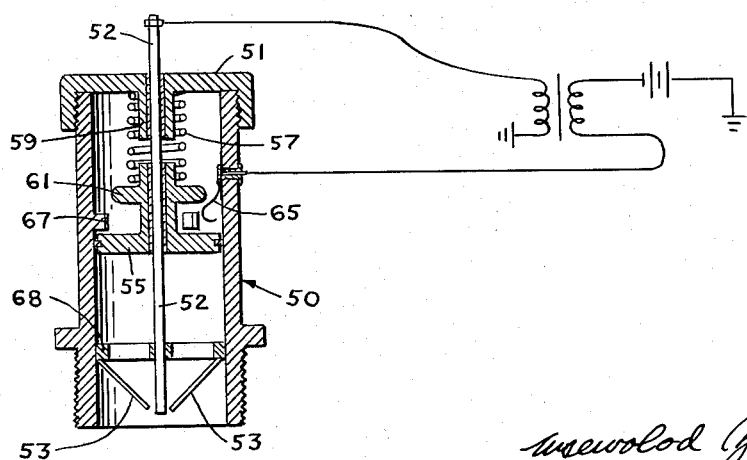
FIG. 11
INVENTOR.
Usewolod Zalisko
BY
Roy Griffith Jones United States Patent Office 2,989,040
Patented June 20, 1961

This invention relates to a new type of internal combustion engine, which is capable of delivering more power for a given size and weight than is provided by the conventional type of internal combustion engine. Therefore, the main objective accomplished by my invention is an engine smaller in size and of less weight than a conventional engine for a given power output.

Another object of my invention is to realize greater efficiency in transforming the energy obtained from the combustion of fuel into mechanical energy output, by eliminating the crank shaft and replacing it with a special mechanism converting an oscillating motion to rotary motion.

A further object of the invention is to construct an engine which may be operated on either spark ignition or compression ignition cycles, and on either a four stroke or two stroke cycle.

A still further object is to provide for a variable compression ratio which will allow the use of fuels of different octane ratings.

Another object is to provide an engine in which intake and exhaust valves are controlled by pressure of gases from the combustion chambers.

It is a further object to provide an engine with an ignition system which is not dependent on a distributor but on the pressure in the chamber itself, so that a distributor is not needed.

Another object is to provide an engine in which the spaces on both sides of the oscillating blades, which replace the usual pistons, are used as separate combustion chambers, and which, in effect make two combustion chambers out of one cylinder.

The engine of this invention also provides smoother operation and less vibration, due to a more uniform application and utilization of power from the motive medium.

Other advantages are that the invention may be converted to a compression ignition engine, using a carburetor or a fuel injector. Using a carburetor and disconnecting the spark plugs, or in case a spark plug or electric supply should fail, the fuel mixture will be compressed until it is ignited by the heat of compression.

This engine may be adapted to operate on different compression ratios by the simplest possible adjustment of one mechanical element, as shown in the drawings and hereinafter explained.

In general outline, the engine illustrated in the drawings comprises two adjacent stationary cylinders through which the engine shaft passes axially. The engine shaft does not rotate but oscillates, and is made to oscillate by the oscillation of blades within said cylinders, there being one blade in each cylinder. These blades are secured to the engine shaft and are disposed 180° apart, that is, they extend from the shaft in opposite directions, thereby balancing the shaft. Each of the mentioned cylinders is divided internally, by a partition, into two explosion chambers, the partition consisting of the engine shaft, the oscillatable blade attached thereto, and a stationary radial member extending from the internal periphery of the casing to the engine shaft, said radial member having inlet and exhaust ports. Since the blade oscillates relatively to said stationary member, it will be seen that the relative volumes of the chambers of each cylinder vary with the position of the blade. This means that, during each power stroke, the two compartments in each cylinder are substantially converted into and utilized as one. Thus each cylinder takes the place of two, with a large saving of weight, space and expense. This is a further valuable feature of the invention.

The engine also includes mechanism for transforming the oscillating motion of the engine shaft into rotary motion of a second or output shaft. The spark plugs preferably employed in this engine are of a new type, which includes a piston moved against spring pressure by compressed chamber gas to a point where it closes a circuit to cause sparking. The sparking time for any desired compression of the fuel-air mixture may be obtained by adjusting the spring pressure, which may be done readily by turning a screw cap against the spring; thus adjustment may be quickly made for different compression ratios.

In this application the drawings and description show a four stroke engine, but it is obvious that those skilled in the art will know how to construct a two stroke engine, on the same principle after reading the disclosure.

The drawings illustrate the invention, and in these:
FIG. 1 is an elevational view, partly in section and partly broken away;
FIGS. 2, 3 and 4 are vertical sections taken respectively on lines 2—2, 3—3 and 4—4, of FIG. 1;
FIGS. 5, 6 and 7 are horizontal sections taken respectively on lines 5—5, 6—6 and 7—7, of FIG. 1;
FIGS. 8 and 9 illustrate action taking place in the engine chambers;
FIG. 10 is a table showing the sequence of actions in the cylinders; and
FIG. 11 is a vertical section through a preferred spark plug employed in the cylinders.

Referring to the drawings for a more detailed description thereof, the numeral 10 indicates a cylindrical casing, having internal partitions 14, 15 and 16, providing a series of adjacent cylinders 18, 19, 20 and 21. Cylinders 18 and 19 are the power cylinders, cylinder 20 is an air compressor, and cylinder 21 contains mechanism for changing the oscillating motion of the engine shaft to rotary motion of the output shaft. Engine shaft 25 extends from beyond the left end of the casing 10, through partitions 14, 15 and 16, to a point 27 near the right end of the casing, and has its bearings on said partitions and the left end of the casing. Cylinder 18 is shown in cross section in FIG. 2, which shows the engine shaft 25 at the center. A blade 29, which is adapted to oscillate, is secured to the shaft and extends radially therefrom to the inner periphery of the cylinder 18, making close contact therewith and with the end walls thereof, that is, with the left end of casing 10 and with the partition 14. A wedge shaped, fixed partition 33, having intake and exhaust ports for each chamber, is within the cylinder 18 and extends from the inner periphery of the cylinder to the shaft 25, and makes a close fit with the latter. The cylinder 18 is thus divided into two chamber, A and B (FIGS. 2 and 8) by the partition 33, the blade 29 and the shaft 25. Cylinder 19 is similar to cylinder 18 and is divided into chambers C and D (FIG. 9), the wedge-shaped partition being numbered 35 and the blade 36, but are oppositely positioned to those of cylinder 18. The intake ports for the chambers A, B, C and D are respectively designated 3A, 3B, 3C and 3D, while their respective exhaust ports are 4A, 4B, 4C and 4D.

There is, for each chamber, an intake and an exhaust port, in both of the mentioned wedge-shaped partitions 33 and 35. Intake ports 3A, 3B, 3C and 3D are respectively governed by intake valves 5A, 5B, 5C and 5D and exhaust ports 4A, 4B, 4C and 4D are respectively governed by exhaust valves 6A, 6B, 6C and 6D. Intake ports 3A and 3B lead to a common chamber IAB and then to the carburetor through conduit 40 (FIG. 1). Intake ports 3C and 3D lead to a common chamber ICD and then to carburetor through conduit 42. Exhaust ports 4A and 4B lead to a common chamber EAB and then to exhaust pipe 44. Exhaust ports 4C and 4D lead to a common chamber ECD and then to exhaust pipe 46.

The port valves are closed by springs, and are opened by gas-pressure operated valve openers. Valve opener 7AI opens valve 5A; valve opener 7BI opens valve 5B; valve opener 7AE opens valve 6A; valve opener 7BE opens valve 6B; valve opener 7CE opens valve 6C; valve opener 7DI opens valve 5D; valve opener 7CI opens valve 5C; valve opener 7DE opens valve 6D. Each valve opener comprises a cylinder 7, a piston 8, and a compressed spring 9 coiled around a stem 22 between the piston and an end of a cylinder. The cylinders of valve openers 7AI and 7CE are connected by pressure conduit 10D to chamber D; the cylinders of valve openers 7BI and 7AE are connected by pressure conduit 10C to chamber C; the cylinders in valve openers 7BE and 7DI are connected by pressure conduit 10A to chamber A; and the cylinders of valve openers 7CI and 7DE are connected by pressure conduit 10B to chamber B.

Each of the chambers A, B, C and D has a spark plug respectively numbered 11A, 11B (FIGS. 2 and 8), 11C and 11D (FIG. 9). The construction of these plugs is shown in FIG. 11. The spark plug comprises a hollow cylinder 50 having a screw cap 51, a central electrode 52 and angular electrodes 53 converging from the cylinder towards the central electrode. The pressure of gas from the combustion chamber lifts the piston 55 against the action of a compressed spring 57 which is coiled around the stem of the piston and also around a centrally depending portion 59 of the screw cap 51, the spring bearing against the inner surface of said cap and against a circular, laterally projecting flange 61 which extends from the stem of said piston. The piston is moved by the mentioned gas pressure until flange 61 contacts spring 65, which is secured to and insulated from cylinder 50. Upon contact of flange 61 with said spring, the low voltage circuit is closed through the induction coil, high voltage acting through electrode 52 and causing the spark. Stops 67 and 68 are provided in the cylinder to limit the movement of the piston. To adjust the firing of the spark plugs for different compression ratios, it is only necessary to adjust the pressure of coiled spring 57 by turning the screw cap 51 in the proper direction and to the proper extent.

As the blades for chambers A—B and C—D have an oscillating motion, it is necessary to provide means for transforming the oscillating motion to rotary motion, which is done by alternately acting, self-engaging, unidirectional clutches. Such means comprises the following components. Circular drum 70 is mounted freely on shaft 25, and a clutch 71, secured to shaft 25, fits into this drum (FIGS. 1 and 4). A drum 74, through which engine shaft 25 also passes freely, is secured to output shaft 75 (FIG. 1) which is aligned with the engine shaft. Drum 74 contains a clutch similar to clutch 71 (FIG. 4) contained in drum 70, this clutch being secured to engine shaft 25, as is clutch 71. Motion is transmitted from drum 70 to drum 74 as follows: Drum 70 is secured to bevel gear 78; gear 78 meshes with bevel idler gears 79 and 80, the latter gears being rotatably mounted to the casing 10, opposite each other, as seen in FIG. 1. Gears 79 and 80 both mesh with bevel gear 82, which is secured to drum 74, the latter, as stated, being also secured to output shaft 75. This arrangement of gears provides opposite unidirectional rotation of drums 70 and 74.

As the shaft 25 oscillates in one direction, one of the clutches grips its drum and rotates the drum in the same direction. At the same time the other drum rotates in opposite direction causing free slipping of its clutch.

When the engine shaft changes its direction of oscillation, the gripping clutch releases its hold on the drum and slips freely whereby slipping clutch grips its drum and rotates it.

The output shaft 75, which is secured to drum 74, thereby receives rotational or unidirectional motion from the oscillating motion of the engine shaft 25.

Clutch 71 (FIG. 4), within drum 70, has four arcuate shoes 85 which alternate to frictionally grip the inner periphery of the drum and release from it, depending on the direction of rotation of shaft 25. A spider 87 is secured to shaft 25, and said shoes are connected with the spider by links 90', which are non-radially so positioned as to thrust the shoes against the drum to lock them together when the shaft and attached spider turn in one direction, but, when the shaft turns in the opposite direction, the shoes are retracted. Coiled springs 86, one for each shoe, are connected to the respective shoes and to the spider 87 and press the shoes against the drum. The clutch 77, within drum 74, is similar in construction, but locks with its drum only when clutch 71 is released from its drum 70, the links in clutch 77 being oppositely disposed to the links of clutch 71, so that their thrusting action on the shoes will be in opposite phase.

Any suitable means may be used to start the engine, such as compressed air from an outside source, for example, the air being directed into chambers A, B, C and D in the firing sequence of the chambers, as shown in FIG. 10. This will simulate the operation of the engine, oscillating the blade, and opening the valve for induction of fuel. To provide compressed air for starting and for other purposes, I show an air compressor in cylinder 20. It operates on the same principle as the conventional air compressor, except that the usual piston is replaced by a blade which oscillates with the engine shaft. When the engine is running, it compresses air and sends it to an external storage tank. The compressor comprises a blade 80 secured to engine shaft 25 (FIG. 3), and it has a wedge-shaped partition 82 extending from the inner periphery of the casing to shaft 25, and contains four ports, two of which are intake ports and the other two exhaust ports. The compressor has two chambers for air compression, one intake and one exhaust port for each chamber. The two intake ports are designated 84 and 85; the two exhaust ports are designated 88 and 89 (FIG. 7). The air is taken into the compressor through opening 96 (FIG. 6). FIG. 6 shows the intake valves 90 and 91, and the exhaust valves 92 and 93. In FIG. 6, outlet 95 leads to an external air storage tank. The intake and exhaust valves 94 are pressure-responding and are similar to valves being used in conventional reciprocating compressors.

High pressure resulting from combustion in chamber A opens valve 6B, which is an exhaust valve, and opens 5D, an intake valve for chamber D. At the same time, the same pressure moves the blade 29. As blade 29 moves, it forces out combustion gases from chamber B; also chamber D will draw fuel mixture through intake port 3D. In chamber C, at that time, compression occurs and is completed when the blade reaches one extreme. At this point the spark plug ignites the mixture. The above actions occur during one swing of the blade. When compression is completed in chamber C a spark will occur and cause combustion therein. The blade now starts swinging back. Pressure arising from combustion in chamber C opens exhaust valve 6A in chamber A, and also intake valve 5B in chamber B and at the same time compression takes place in chamber D. The blade has now completed one oscillation (2 swings). Combustion now occurs in chamber D. As a result, intake valve 5A will open and exhaust valve 6C will open. The blade will now being a second cycle and compression will occur in chamber B; at the same time as compression in chamber B progresses, exhaust or expulsion of gases occurs in chamber C; chamber A draws in fuel mixture at the same time. When compression is complete in chamber B, combustion in that chamber will occur and the blade will start swinging back. The pressure arising from combustion in B will open the exhaust valve 6D in chamber D and will open intake valve 5C in chamber C. As the blade continues to move, chamber A will be in compression and chamber C will draw in fuel mixture, also, chamber D will exhaust combustion gases. This completes a cycle. FIG. 10 shows the sequence of the different phases in the chambers.

When the engine operates on the compression ignition principle, the blade moves to one extreme and compresses the fuel until the fuel is ignited by compression. To accomplish this, higher compression is necessary than when using a spark plug, and a greater swing of the blade will allow such higher compression.

What is claimed is:

In an internal combustion engine, the combination of a pair of cylinders, a single engine shaft adapted to oscillate, and disposed axially in the cylinders, only one oscillatable blade-piston in each cylinder and adapted to oscillate the shaft through more than 180 degrees, the blade pistons extending radially from the engine shaft in opposite directions, a partition in each cylinder extending from the inner periphery of the cylinder to said shaft, and functioning with said shaft and blade-piston to divide the cylinders, each into two chambers, said partitions each having an intake and an exhaust port for each of the chambers, valves for said ports, tubular connections disposed between the chambers of the cylinders so that expanding gases in a chamber of one cylinder will open an intake valve in a chamber of the other cylinder.

References Cited in the file of this patent

UNITED STATES PATENTS

| | | |
|---|---|---|
| 631,685 | Weingartner | Aug. 22, 1899 |
| 776,708 | Way | Dec. 6, 1904 |
| 857,149 | Beard | June 18, 1907 |
| 1,069,936 | Frank | Aug. 12, 1913 |
| 1,207,753 | Herrick | Dec. 12, 1916 |
| 1,346,805 | Barber | July 20, 1920 |
| 1,737,082 | Gough | Nov. 26, 1929 |
| 1,799,294 | Gough | Apr. 7, 1931 |
| 2,140,571 | Blocker | Dec. 20, 1938 |

FOREIGN PATENTS

| | | |
|---|---|---|
| 3,243 | Germany | Sept. 28, 1877 |
| 619,995 | Great Britain | Mar. 17, 1949 |